United States Patent [19]
Trotta, Jr.

[11] Patent Number: 5,595,264
[45] Date of Patent: Jan. 21, 1997

[54] SYSTEM AND METHOD FOR AUTOMATED SHOPPING

[76] Inventor: Frank P. Trotta, Jr., 53 Bote Rd., Greenwich, Conn. 06830

[21] Appl. No.: 294,016

[22] Filed: Aug. 23, 1994

[51] Int. Cl.$^6$ .................................................... A47F 9/04
[52] U.S. Cl. .............................. 186/56; 186/61; 235/383
[58] Field of Search ................................ 186/52, 55, 56, 186/61; 235/381, 383, 472

[56] References Cited

U.S. PATENT DOCUMENTS

| | | |
|---|---|---|
| 3,532,184 | 10/1970 | Blake . |
| 3,716,697 | 2/1973 | Weir . |
| 3,737,631 | 6/1973 | Harris . |
| 3,746,130 | 7/1973 | Bullas . |
| 3,836,755 | 9/1974 | Ehrat . |
| 3,920,100 | 11/1975 | Dunphy . |
| 4,373,133 | 2/1983 | Clyne et al. ............................ 235/383 |
| 4,509,123 | 4/1985 | Vereen . |
| 4,578,571 | 3/1986 | Williams ................................ 235/472 |
| 4,803,348 | 2/1989 | Lohrey et al. ......................... 235/381 |
| 4,814,592 | 3/1989 | Bradt et al. ............................ 235/381 |
| 4,929,819 | 5/1990 | Collins, Jr. ............................. 235/383 |
| 5,013,896 | 5/1991 | Ono et al. .............................. 235/381 |
| 5,047,614 | 9/1991 | Bianco ................................... 235/385 |
| 5,101,098 | 3/1992 | Naito ................................. 235/379 X |
| 5,186,281 | 2/1993 | Jenkins ................................... 186/55 |
| 5,345,071 | 9/1994 | Dumont ............................. 235/472 X |
| 5,361,871 | 11/1994 | Gupta et al. ............................ 186/52 |
| 5,397,882 | 3/1995 | Van Solt ................................ 235/381 |
| 5,408,077 | 4/1995 | Campo et al. ..................... 235/383 X |
| 5,468,942 | 11/1995 | Oosterveen et al. ................ 186/52 X |

Primary Examiner—F. J. Bartuska
Attorney, Agent, or Firm—Banner & Witcoff, Ltd.

[57] ABSTRACT

A system and method of automated shopping, including a portable bar code scanner for scanning bar code indicia information on items selected to be purchased, securing the scanner in a holder for limited access, and releasing the portable bar code scanner upon receiving an authorized payment card. A plurality of items for purchase are displayed in a store such that a customer can select an item to be purchased from the store display. The customer scans the bar code indicia on the selected item from the store display. The payment card is debited for the purchase price of the selected item and then returned to the customer.

13 Claims, 4 Drawing Sheets

SYSTEM AND METHOD FOR AUTOMATED SHOPPING

TECHNICAL FIELD

The present invention relates to a system and method for automated shopping and, more particularly, to a system and method for automated shopping wherein the point of sale occurs simultaneously with the selection of the desired item by the customer, thereby providing greater efficiency for the customer and the retailer.

BACKGROUND OF THE INVENTION

In self-service retail establishments, such as grocery stores, drug stores, department stores and the like, the retail goods are generally arranged on open shelves for selection by the customer as they walk around the shop or store. The customer pushes a grocery cart or carries a hand-held basket through the aisles between the shelves and removes the desired items from each shelf. The customer then takes their completed selection of goods to a cashier located at a sales terminal or check-out area. At the sales terminal, the customer unloads their purchases from the cart or basket onto a counter or conveyor and the cashier enters or scans the price of each item into the cash register, which computes the total cost of the purchase. The cashier or the customer then packs the items into plastic bags, paper bags, or boxes for the convenience of the customer in carrying the selected items home. After the cashier receives the cash, check, or credit card payment for the total purchase price of the selected items, the customer takes the bags of groceries or other goods and leaves the check-out station to return home.

The problems associated with this type of retail shopping are well-known. From the customer's standpoint, there is congestion arising from the use of shopping carts in narrow aisles, standing in line to reach a check-out terminal and to pay for the selected items, and the inconvenience of having to unload the selected items onto the conveyor just to turn around and load them back into the cart after the items are bagged. From the retailer's perspective, there are labor costs associated with providing cashiers at a plurality of check-out terminals, labor costs associated with restocking the shelves of products, security costs and shoplifting losses, and a limited amount of shelf space available for displaying the retail items.

Various systems have been proposed to overcome these problems and to facilitate customer selection of items, communication of the selection to a supply area, and transportation of selected items from the supply area to a station for delivery to the customer and receipt of payment from the customer. For example, U.S. Pat. No. 5,047,614 to Bianco provides the customer with a scanner or portable terminal capable of scanning bar codes of various products while he is at home. The customer then takes his portable terminal to the retail store and connects it with a host computer at the store. The host computer will print out a list for the customer or, in accordance with another embodiment of the invention, the host computer will transmit the list of desired items to a warehouse where the customer's order is manually or automatically packaged and moved to a pick-up location along with the total invoice for payment of the items selected.

U.S. Pat. No. 5,186,281 to Jenkins also discloses a method of shopping wherein a credit card, debit card or special card issued by the retail establishment identifies the customer as they select each item from the display area. A magnetic stripe reader is positioned at each display area for receiving the credit card and keypads are provided so that the customer can indicate which item they desire by an alpha numeric location. This information is transmitted to a pre-check terminal and to the product stocking area so that the selected items can be bagged or boxed for the customer. In addition, as the items are assembled from the product stocking area, a record of the selected items is maintained and printed by a terminal. When the customer has finished shopping, they then proceed to the check-out terminal and give the cashier the previously used credit card or debit card. Here, the customer receives an itemized, totaled receipt prepared by the check-out station including their identification number and account verification. The customer then leaves the retail store and proceeds to the finalizing terminal to receive his purchase. The operator of the finalizing terminal compares the receipt obtained by the customer from the check-out terminal with the record printed by the finalizing terminal and, if the receipts are in agreement, the operator charges the customer's account and the purchases are loaded into their vehicle for completion of the transaction.

Further, U.S. Pat. No. 4,373,133 to Clyne, et al. discloses a portable scanner which attaches to the shopping carts or baskets commonly used in retail grocery stores. As the customer places the items they select off the shelves into the cart, they simultaneously take a scanning wand attached to the scanner and move it across the bar code indicia for that item. The scanner device is adapted to read both the price and the weight of the selected item. Thus, when the customer proceeds to the sales terminal, the total weight of their purchases is compared to the total weight displayed by the scanner. If the weights are in agreement, the sales clerk then produces a bill on the cash register equal to the total price shown on the scanner.

These prior art systems, however, do not eliminate the lengthy and sometimes objectional check-out queues in which the customer must wait just to purchase his selected items.

SUMMARY OF THE INVENTION

The present invention overcomes these problems, among others, by providing a method for automated shopping using a portable bar code scanner. The method for automated shopping includes the steps of accepting an authorized payment, releasing a portable bar code scanner, displaying a plurality of items for purchase, selecting an item to be purchased, scanning the bar code indicia related to the selected item, and debiting the payment medium for the purchase price of the selected item.

In a preferred embodiment, the scanner is released from its holder to a customer after an authorized credit card, debit card or like payment medium is accepted. The customer then proceeds to shop along the aisles of the retail store and scans the bar code indicia on the desired items. When the customer pushes a button on the scanner to confirm the purchase of a scanned item, the indicia code information is transmitted to an in-store computer. The computer performs the functions of adding the purchased item to the customer's total bill and receipt, debiting the item from the customer's payment card for the price of each item as it is scanned, adjusting the inventory total within the store, and transmitting the information to an inventory retrieval system. The inventory retrieval system then collects each item which the customer purchases and places it into a box or bag for pickup by the customer when the shopping is completed. Thus, when the customer has completed their shopping, they merely return the scanner to its holder and receive in exchange the return of their credit card, a receipt showing the total amount debited thereto for the selected items, and the appropriate bag or box number or code which will contain the purchased items. In an alternative preferred embodiment of the invention, the payment or credit card is used for identification of the customer while they are shopping. Thus, when the selected items are scanned, the in-store computer merely records the purchase to the customer's account and the receipt. Then, once the customer has finished shopping and returned the scanner to its holder, the customer pushes a button on the scanner to confirm the final purchase of the scanned items and the computer debits the total purchase to the customer's payment card.

Accordingly, by utilizing a portable scanner and in-store computer such that the point of sale occurs simultaneously with the point of selection of each item, lengthy check-out lines and labor costs are avoided in the preferred embodiments of the present invention.

BRIEF DESCRIPTION OF THE DRAWINGS

The above description and other objects, advantages, and features of the present invention will be more fully understood and appreciated by reference to the specification and accompanying drawings, wherein.

DETAILED DESCRIPTION OF THE PREFERRED EMBODIMENTS

Figure 1:
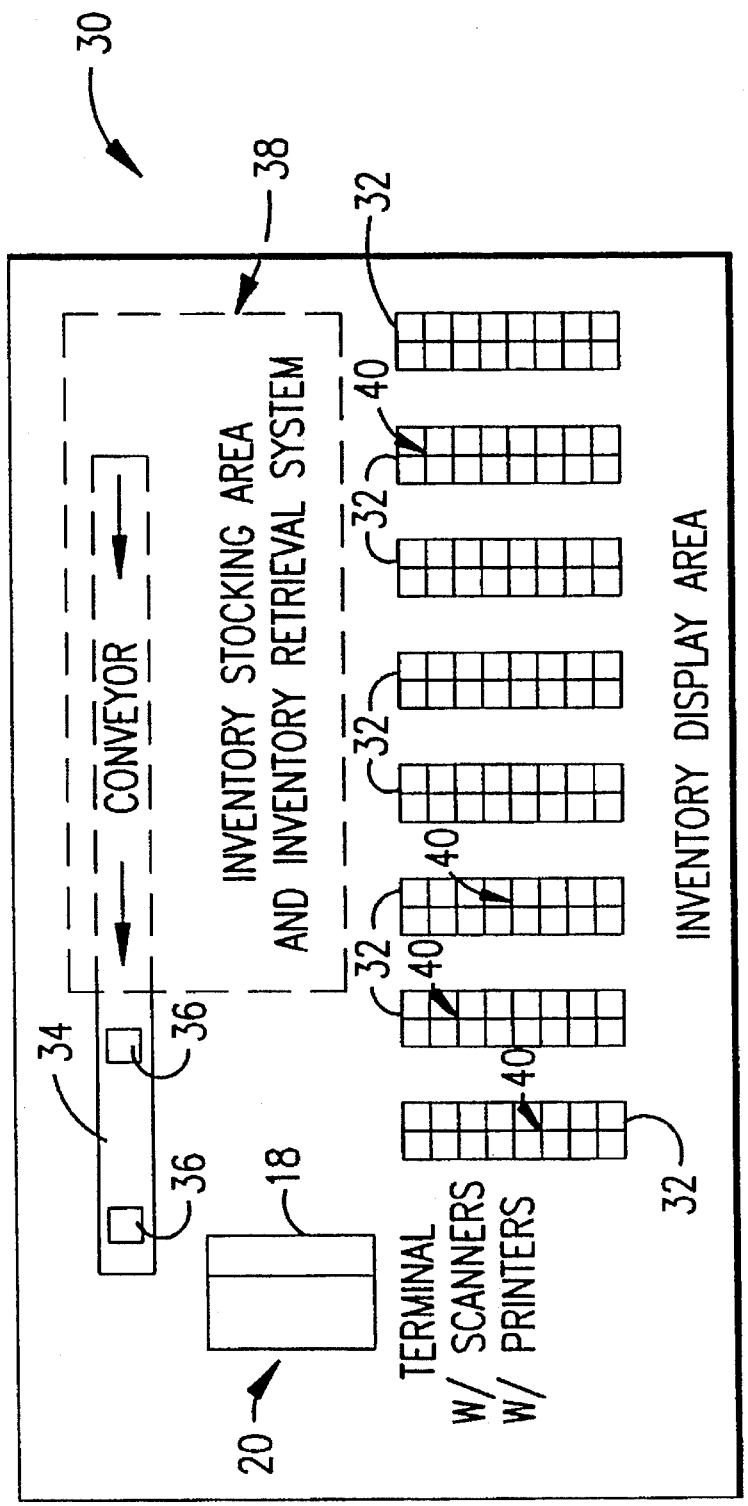
FIG. 1 is a diagrammatic view of the system and method of automated shopping according to the present invention.
Figure 2:
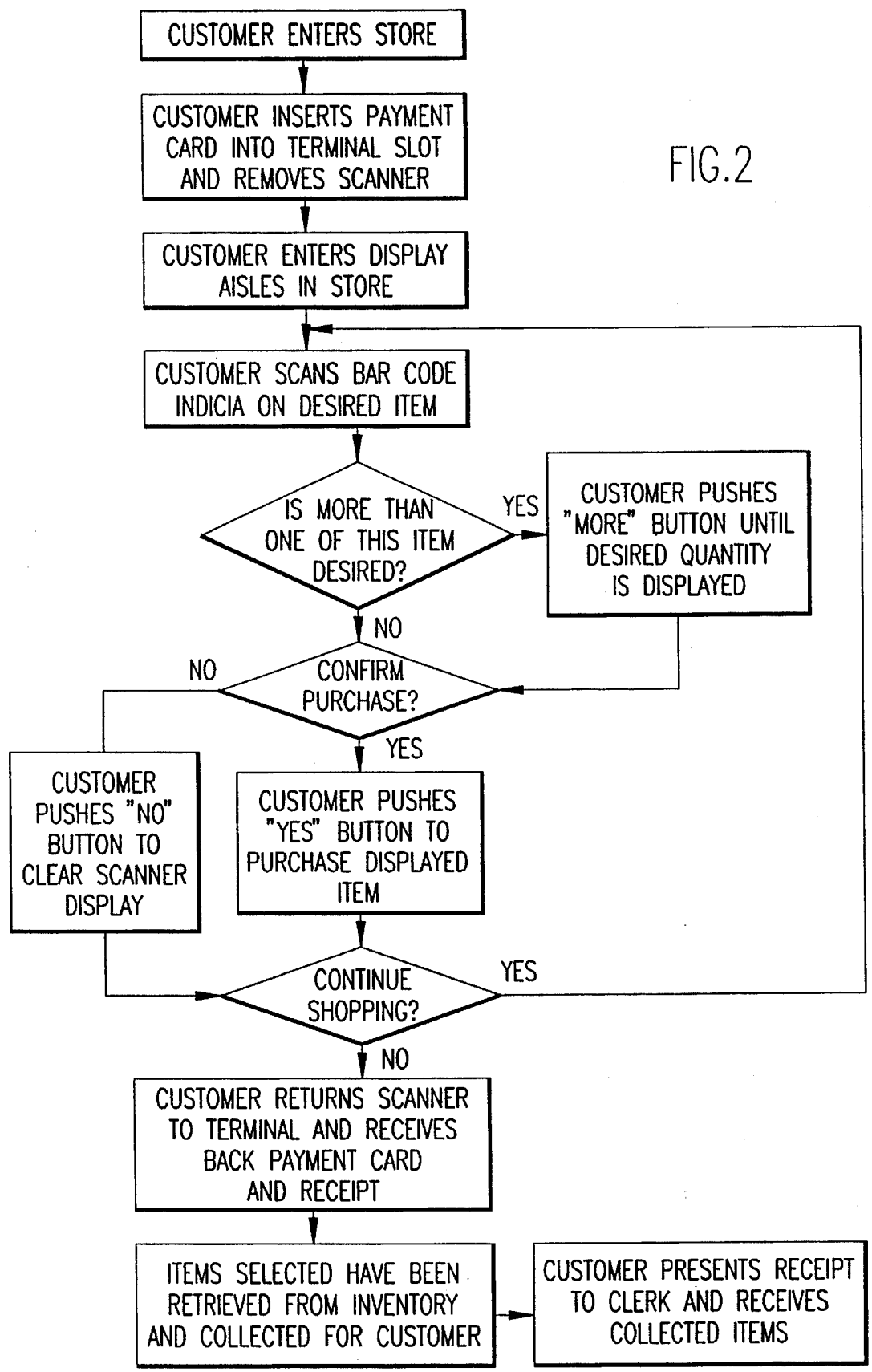
FIG. 2 is a flow chart diagram thereof.
Figure 3B:
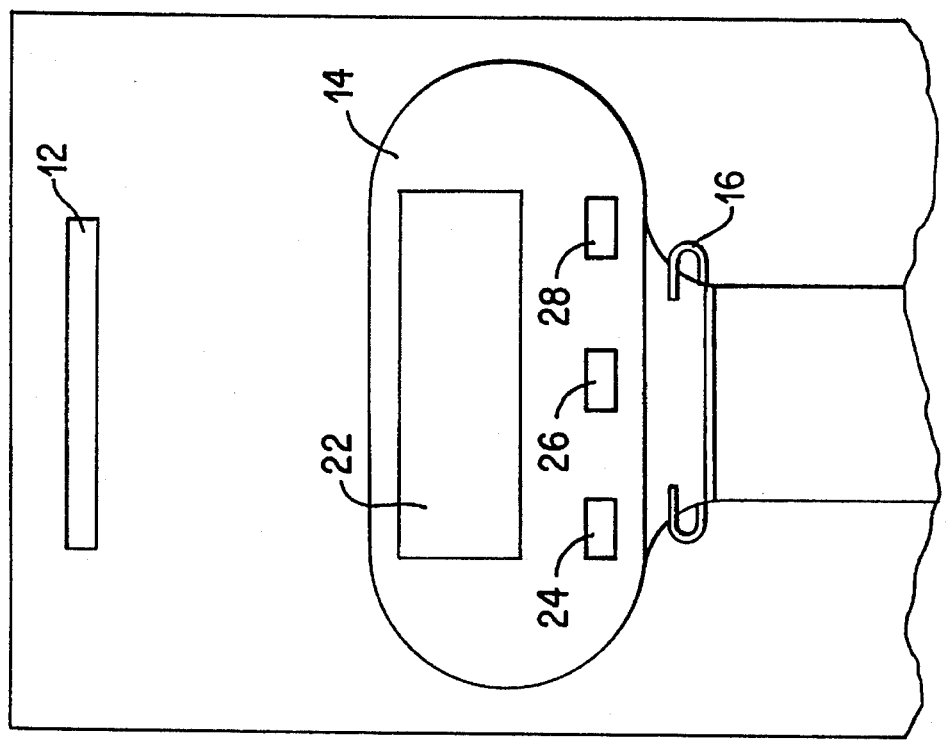
FIG. 3 is an enlarged elevational view of a scanner terminal utilized therein.
Figure 3A:
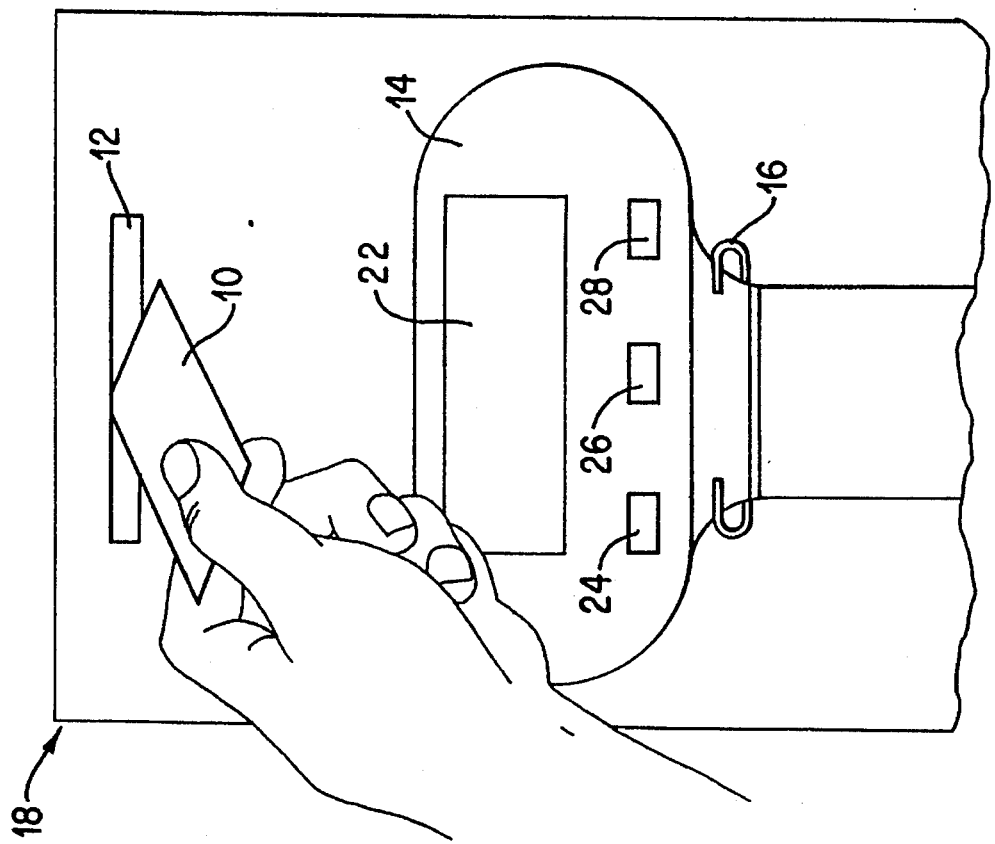

The present invention is directed to a system and method of automated shopping, as shown diagrammatically in FIG. 1, intended as an exemplary top down view of a retail store 30. The present invention is ideally suited for use in self-service shopping facilities, such as supermarkets, convenience stores, drug stores and the like. Referring also to FIGS. 2 and 3, the customer enters the store 30 (FIG. 1) and inserts a credit card, ATM card, store-issued debit card, or other such payment card or medium 10 (FIG. 3) containing coded information into a receiving mechanism or slot 12 in the scanner terminal 18, where a plurality of scanners 14 are secured within holders 16. The receiving slot 12 preferably has a magnetic stripe reader or other mechanism for reading the coded information from the payment medium. Upon insertion of the payment card 10 and authorization thereof, a hand-held, portable scanner 14 is released from the holder 16 to the customer for use while shopping. The payment card 10 is retained by the receiving mechanism 12 of the scanner terminal 18 until the portable scanner 14 is returned to the holder 16, as discussed further below. The payment card 10 is authorized if the coded information reveals to an in-store computer 20 (FIG. 1) that at least some funds are available for use. Preferably, computer 20 will record the amount of funds available and the customer's shopping limit will thereby be established. The in-store computer 20 may be located with scanner terminal 18 or at a location remote therefrom in store 30 of FIG. 1.

Each scanner 14 has a bar code reading mechanism as is well-known in the prior art and described in U.S. Pat. No. 4,578,571 to Williams, the contents of which are hereby incorporated by reference. The scanner 14 further operates on ultrasonic, microwave, infrared, or radio frequency or other similar system such that there are no wires connecting the portable scanners 14 to communicate with the in-store computer 20 via transceiver 40 on shelf 32 or elsewhere. Preferably, the present invention uses spread spectrum technology or other multiple frequency technologies since there are a plurality of scanners being utilized at any given time and the use of several standard transmitters simultaneously would likely clog a single frequency. Moreover, there may be considerable noise in the transmission frequency band of interest. Scanner 14 comprises transmitting receiver circuitry for two-way communication with computer 20 via appropriately placed transmitters on the shelves 32 or mounted in the ceiling or located at computer 20, for example, in the case of long distance radio frequency communication. Consequently, each scanner 14 includes an LCD panel 22 which faces the customer and preferably three or more buttons 24, 26, 28 which can be actuated by the customer as they make the desired selections. In a preferred embodiment, the buttons are color coded such that button 24 is green, button 26 is yellow, and button 28 is red. As explained in detail below, these buttons are used to confirm the purchase of a scanned item via display 22 and to increase the quantity thereof, or cancel the purchase of the scanned item via computer 20.

Figure 4:
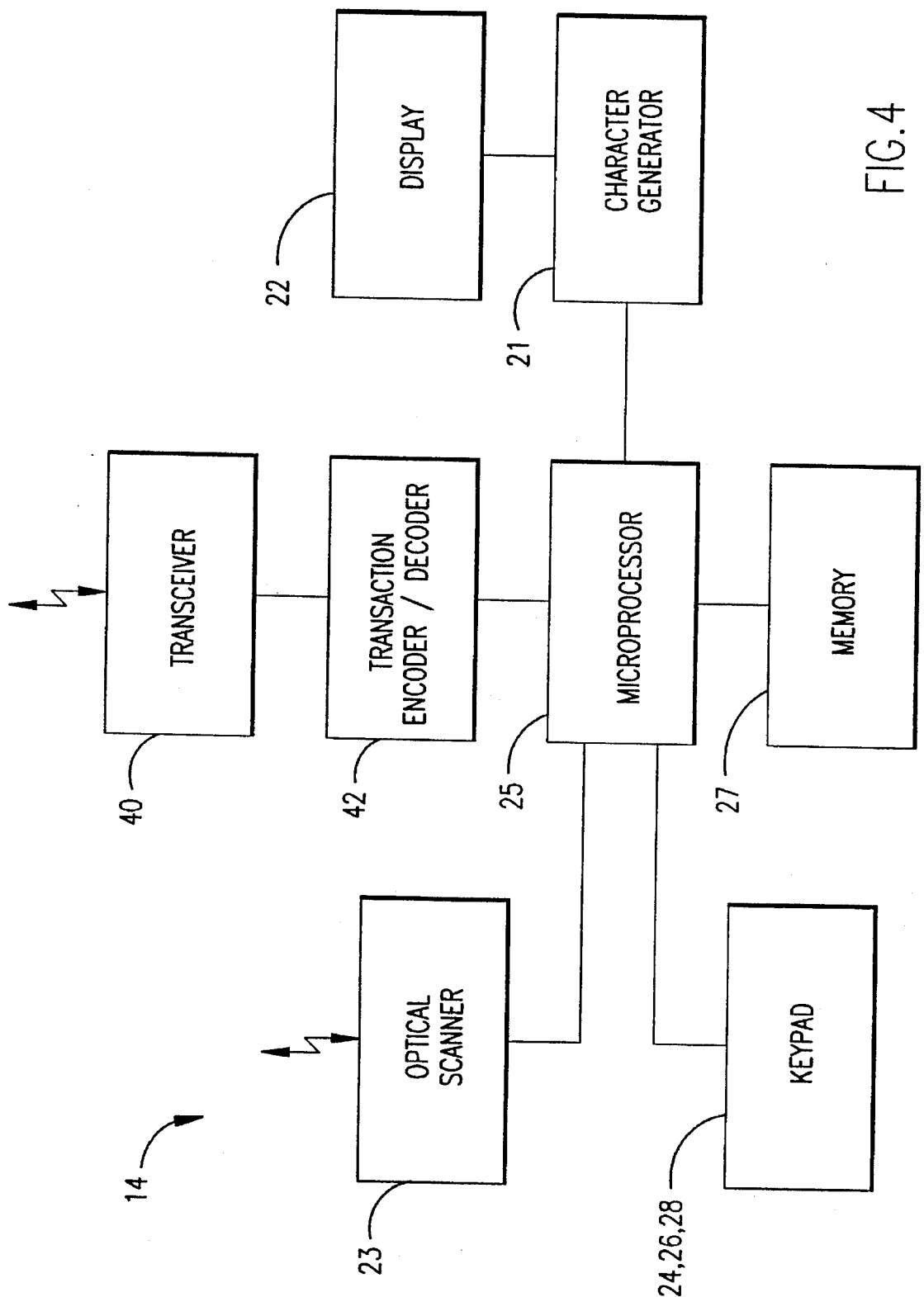
FIG. 4 is a diagrammatic representation of a portable hand-held scanner for use in the system and method of the present invention.

Portable scanner 14 includes an optical scanner 23 which transmits the encoded bar bode indicia information to a microprocessor 25, as diagrammatically shown in FIG. 4. Keypad buttons 24, 26, 28 also communicate the customer's selection to the microprocessor 25. Microprocessor 25 then transmits this received information to the in-store computer 20 by way of a transceiver 40 and transaction encoder/decoder 42. Computer 20 processes this information and returns the appropriate signal to microprocessor 25 such that the customer is correctly informed of their shopping purchase. That is, microprocessor 25 will transmit the desired message signal through a character generator 21 in order to make it visible on display panel 22 of scanner 14. In doing so, microprocessor may also utilize certain pre-programmed messages or product information contained in memory 27. For example, particular special sale event messages may be transmitted and stored via transceiver 40 and microprocessor 25 in memory 27 for display on display 22 on a daily basis.

According to the present invention and referring again to FIG. 1, the store or supermarket 30 is merely a showroom with a sample or two of each product displayed on a plurality of shelves 32. An empty box prototype could even be used instead, since the customer could still read the ingredients on the box and see, for example, the calorie and fat contents thereof. If empty prototypes are used, the store could eliminate refrigeration cases, shelf-life or freshness problems, and shoplifting problems. In addition, since the store need only display one or two of an item rather than thirty or forty of each item as is presently done, the shelf space within the store increases dramatically. Further, in a preferred embodiment, the warehouse or inventory stocking area is located on a separate floor or downstairs from the display area where customers shop. Thus, the usable floor space of current stand-alone stores is doubled. In prior art supermarkets and other such stores, two-stories cannot easily be used because of the shopping carts. However, in the present invention, the stores can double or even triple their capacity by building the display showroom on an upper level floor.

After receiving the portable scanner 14, the customer enters the display aisles in the store to select the desired items for purchase. The customer will select a sample item or an empty prototype for the item and scan the bar code indicia on the box, can or the like by passing the scanner 14 thereover. The scanner display panel 22 then shows the item which has been scanned, i.e. Kellogg's corn flakes, and the price of the item, i.e., $3.69. The display will also indicate a choice of the quantity of the item which the customer desires to purchase. For instance, above the green button 24 may be numeral "1", above the yellow button 26 may be displayed the words "more", and above the red button 28 may be displayed "none" or "cancel". Thus, if the customer desires to purchase one of this scanned item, he will press the green button 24; if the customer has decided not to buy any of this scanned item, he will press the red button 28; and if customer desires more than one of this scanned item, he will then push the yellow button 26. Other forms of data entry well-known in the art such as a numeric keypad may also be utilized for this purpose. Upon pushing the yellow button 26, the scanner display 22 may be programmed to display an additional message, i.e., "great idea to stock up" and the quantity number above the green button 24 will increase to 2, or 3, or 4, depending upon how many times the yellow button 26 is pushed. When the desired quantity is displayed above the green button 24, the customer then pushes the green button to purchase the displayed quantity of the scanned item. The customer then returns the prototype or sample item to the display shelf and proceeds to shop for additional items to purchase, if desired.

Meanwhile, when the green button is depressed to confirm the purchase of the scanned item the transaction is then encoded according to well-known manner, the scanner 14 transmits the purchase information to a central, in-store computer 20 using one of the above-mentioned wireless technologies. The in-store computer 20 performs several functions including (1) keeping a running total of the customer's purchases, (2) relaying the item selected for purchase to an inventory retrieval system 38, (3) adjusting the store's warehouse inventory to reflect the purchase of the item, and in one preferred embodiment, (4) debiting the customer's payment card 10 for the purchase price of the selected item. The inventory retrieval system 38 can be a fully automated system that dispatches the selected items by conveyor belt 34 into a box 36 or bag designated for each customer, i.e. box #101, or alternatively, the inventory can be retrieved manually and the customer's order bagged or boxed by hand.

After the customer depresses the green button 24 to confirm the purchase of the quantity of the displayed item, computer 20 transmits to scanner 14 that the transaction is recorded for processing, and the scanner will preferably acknowledge this confirmation by displaying the running total in a message such as "total purchase equals $24.19; you just purchased 1 box of Kellogg's corn flakes at $3.29 plus tax; this brings you new total to $27.56." The bulk of these types of messages are stored in memory 27 of scanner 14 for repeated retrieval by microprocessor 25. Scanner 14 then fills in the specific product information and price based upon the scanned bar code indicia. Thus, the customer is continually apprised of the purchase cost after each item is selected and their running total. The customer continues to scan the bar code indicia on each selected item, select the quantity of the item which is desired to be purchased by pushing the "more" button 26 or the green confirmation button 24, until all of the desired items have been selected for purchase.

At this point, the inventory retrieval system 38 has already collected the selected items for the customer and placed them in the box or bags 36 identified specifically for the customer by the number or code. Therefore, the customer returns to the scanner terminal 18 and replaces the scanner 14 in the holder 16 from which he originally removed it. Thereafter, the customer's payment card 10 is released for return to the customer and a receipt of the total purchases is printed for the customer and, preferably, includes the box or bag number identified for the customer. Thus, the customer proceeds to the store exit where the collected items in specified boxes are placed and hands the receipt to a clerk and receives his box of groceries or other selected items, i.e., box #101.

As discussed above, the computer 20 preferably records the amount of funds available to the customer for shopping. Thus, when the customer selects an item which would raise the total purchase amount above this level of authorization, the scanner display 22 alerts the customer to this situation and requests the customer to return the scanner and receive his receipt.

In a further preferred embodiment of the invention, the payment card 10 is used for identification of the customer during his shopping and the total purchase price of the items is deducted from the customer's account at completion of the shopping. As the selected items are scanned, the in-store computer 20 merely records the purchase to the customer's account and the receipt. Then, once the customer has finished shopping and returned the scanner 14 to its holder 16, the display panel 22 will ask the customer to confirm the final purchase total by pressing the green button 24. Once actuated, the computer 20 debits the total purchase to the customer's payment card 10, and a receipt is issued to the customer.

The present invention also, in a preferred embodiment, allows the customer to cancel his purchase of an item at any time prior to returning scanner 14 to holder 16. If the customer scans the same item a second time, the computer 20 will recognize this as a possible return. In which case, the scanner display will question whether the customer wants "more" or "return". When the yellow button for "more" is depressed, the quantity above the green button will increase as in a normal purchase. However, when the red button is depressed for "return", the quantity above the green button will decrease to 0 or −1, or −2, etc. Thus, if the customer originally selected six of an item A and later decides only three are needed, he scans item A, selects "return", and depresses the button therebelow until −3 appears as the quantity above the green button. By depressing the green button, three of item A will be deducted from the previously selected six of item A, thereby resulting in the purchase of three of item A.

The advantages of the present invention are numerous. There is no waiting in line to check out, bag the groceries, or pay for the selected items. The "ringing" out for the selected items is done at the point of display. The bagging and collection of the items is done in the store warehouse either automatically or manually. Thus, the delays for the customer are virtually eliminated. For the retail establishment, the advantages include no cashiers, no restocking of shelves, no shopping carts at $300 apiece, and no shoplifting since the sample packages can actually be empty boxes. The retail establishment can also save on energy costs by having a larger, more efficient, single refrigeration unit in the inventory warehouse, rather than several small refrigeration cases which customers open and close the doors to every few seconds. In addition, the change in an item's price need be made only once in the in-store computer 20, rather than on each item on the shelf. The scanner display 22 will show the current price listed in the in-store computer, thus complying with state unit pricing and item pricing laws.

The present invention also allows for the following of customers' spending habits from week to week. This produces very valuable shopper specific marketing data which can be sold to manufacturers to subsidize the cost of the technology in the present invention. The retail stores could also sell advertising space on the scanner display to the manufacturers. For instance, the display on the scanner could read "Dear Louis: We at Cheerios would like you to try our new Frosted Cheerios. Here is a coupon for 25¢ off. Just scan this coupon the next time you scan our new Frosted Cheerios and you will have 25¢ taken off the price of the Frosted Cheerios." Alternatively, an advertisement may read "Buy reminder tool for the customer". For example, once a customer has purchased the Kellogg's Corn Flakes, the scanner could display "You bought Kellogg's Corn Flakes. Do you need milk to go with them?" Standard pairs of items could be programmed into the memory (e.g., eggs and bacon, peanut butter and jelly, chips and salsa, etc.).

Although the present invention has been described with respect to preferred embodiments thereof, it will be obvious to one of ordinary skill in the art that numerous modifications may be made without departing from the true spirit and scope of the present invention, which is to be limited only by the appended claims.

I claim:

1. A method of automated shopping, comprising:
   (a) accepting and retaining an authorized payment medium;
   (b) releasing a portable bar code scanner means upon acceptance and retention of the authorized payment medium, the scanner means being secured in a holder for limited access;
   (c) displaying a plurality of items for purchase in a store;
   (d) selecting an item to be purchased from a store display;
   (e) scanning bar code indicia information related to the selected item to be purchased with the bar code scanner means, the bar code indicia indicating at least a purchase price for the selected item; and
   (f) returning the scanner means to the scanner holder;
   (g) debiting the payment medium for the purchase price of the selected item; and
   (h) thereafter, in exchange for the returned scanner means, returning the payment medium.

2. The method of claim 1 further comprising returning the payment medium after said debiting step.

3. The method of claim 1 further comprising:
   transmitting the bar code indicia information from the portable bar code scanner means to a terminal means;
   recording the purchase price of the selected item on a receipt and transmitting the selection of the selected item to an inventory retrieval system.

4. The method of claim 1 further comprising:
   repeating steps (d)–(e) for additional selected items.

5. The method of claim 1 further comprising:
   repeating steps (d) and (e) for additional selected items; and
   wherein step (g) includes debiting the payment medium for the total purchase price of the selected items.

6. The method of claim 5 further comprising:
   confirming the purchase of the selected items after returning the scanner means to the scanner holder.

7. The method of claim 1 further comprising:
   confirming the purchase of each selected and scanned item prior to said debiting step.

8. The method of claim 7 wherein said confirming step includes increasing the quantity of the selected item for purchase.

9. The method of claim 3 wherein the inventory retrieval system retrieves the selected item from inventory and conveys the selected item to a designated pickup location.

10. A system for automated shopping comprising:
    portable bar code scanner means for scanning the bar code indicia information on selected items, the bar code indicia indicating at least a purchase price for each selected item;
    holder means for securing said scanner means within said holder means;
    release means for releasing said scanner means from said holder means upon acceptance of a payment medium, said release means retaining the payment medium, until the return of said scanner means thereto;
    microprocessor means for processing information received from said scanner means;
    transceiver means for communicating information between said microprocessor means and a control means for the automated shopping system via wireless transmission;
    control means for receiving from said transceiver means the bar code indicia information scanned by said scanner means and debiting the payment medium for the purchase price of the selected items;
    an inventory retrieval means for retrieving and accumulating the selected items from inventory, said control means transmitting the items to be retrieved to said inventory retrieval means;
    wherein said release means returns the payment medium after return of said scanner means to said holder means.

11. The system of claim 10 wherein said scanner means includes a display for displaying the purchase price of the scanned item and identification of the scanned item.

12. The system of claim 10 wherein said scanner means includes a means for selecting a desired quantity of each selected item.

13. The system of claim 10 wherein said control means maintains a running total for the purchase price of the selected items and debits the payment medium for the total after return of said scanner means to said holder means.

* * * * *